June 23, 1959     R. FORTUNE     2,891,763
DIAPHRAGM VALVE

Filed Oct. 12, 1954     2 Sheets-Sheet 1

FIG. I

INVENTOR.
BY RONALD FORTUNE
Edward H. Lang
ATTORNEY.

INVENTOR.
BY RONALD FORTUNE
Edward H. Lang
ATTORNEY.

United States Patent Office 2,891,763
Patented June 23, 1959

2,891,763

DIAPHRAGM VALVE

Ronald Fortune, Hamilton, Ontario, Canada, assignor of one-tenth to Edward H. Lang, Hinsdale, Ill.

Application October 12, 1954, Serial No. 461,895

5 Claims. (Cl. 251—333)

This invention relates to diaphragm valves wherein the diaphragm serves as a fluid seal between the chamber of the valve body and the cover or bonnet thus eliminating a stuffing box. More particularly it pertains to a diaphragm valve employing an obturating or closure member which is interposed between the fluid-exposed surface of the diaphragm and an intermediate passageway of the body to control the flow of fluid passing through the valve.

The prior art discloses valves of a similar nature in which the flow of fluid is considerably restricted, mainly because their construction necessitates distortions in the inlet and outlet passages of the body, causing abrupt changes in the direction and volume of flow with consequent objectionable turbulence and pressure drop.

Diaphragm valves, in general, have a large area of the diaphragm exposed to internal fluid pressure when the valve is in use. Consequently, under normal operating pressure, abnormally high loads are imposed on the diaphragm. In large diaphragm valves particularly, the total load imposed on the diaphragm frequently precludes manual closing and therefore some form of auxiliary actuating mechanism, such as air motor or electric-power geared control becomes necessary. In such arrangements, the auxiliary operating mechanism invariably is much heavier and considerably larger than the valve itself.

In the conventional Y-type valve, wherein the bonnet and stem are inclined at an angle to the pipe connecting flanges, supporting of such heavy auxiliary mechanism presents a definite problem with respect to structural support and alignment of the actuating force required to close the valve.

It is therefore one of the main objects of this invention to provide a diaphragm valve of simple construction comprising a novel form of body in conjunction with a novel form of valve closure member, which combination produces inlet and outlet passages of uniform diameter and insures maximum volumetric flow therethrough with minimum turbulence and pressure drop.

Another object of the invention is to provide an intermediate body chamber which forms a guide and support for the valve closure member and also permits substantially straight through flow between the chamber and the outlet passage and increases volumetric confluence therebetween.

A further object of the invention is to provide a structure devised to permit concentric mounting of automatic operating mechanism in vertical relation to the axis of the pipe connecting flanges of the valve whereby to avoid unbalanced mounting and eccentric stresses on the operating mechanism.

Still another object of the invention is to provide a valve closure member of novel construction for use in connection with the valve.

A still further object of the invention is to provide a simple and effective means for attaching the valve stem to the valve closure member.

With these and other objects in view, the advantages of the invention will more readily be understood by reference to the following specification when read in conjunction with the accompanying drawings, in which.

Figure 1:
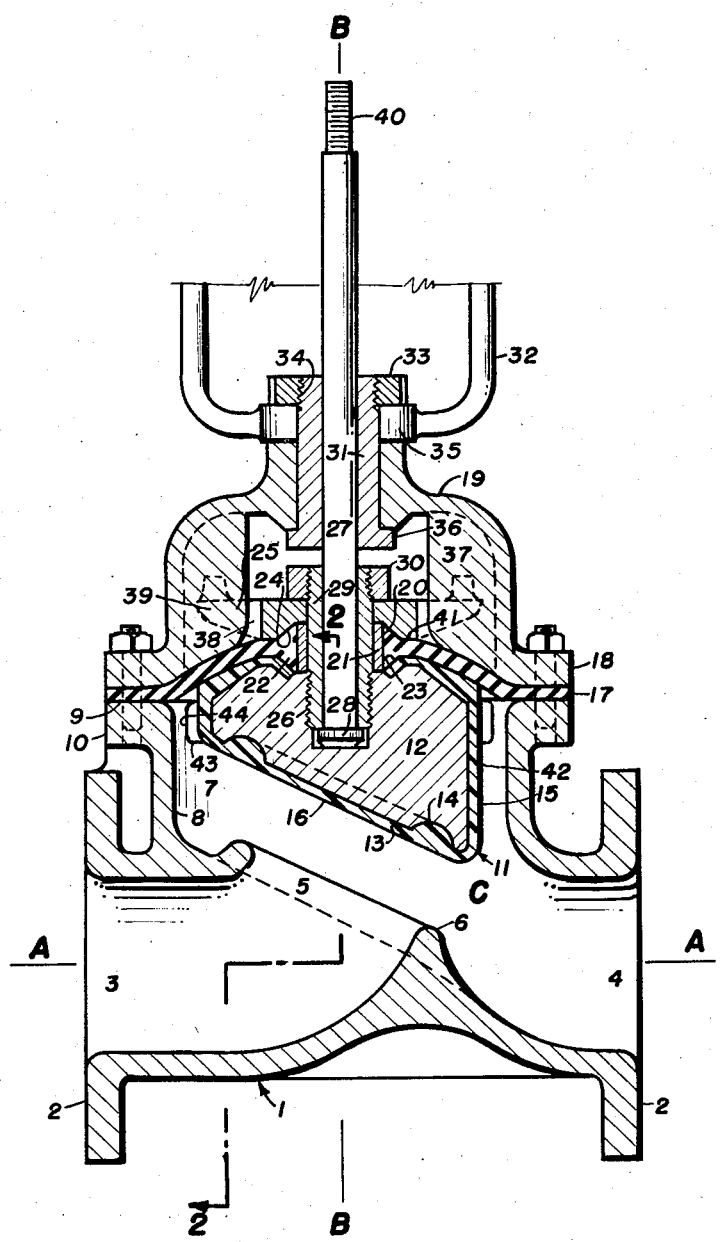
Figure 1 is a longitudinal section of an assembled valve in accordance with my invention illustrating one mode for vertically mounting the sliding stem and yoke of automatic actuating mechanism in large valves.

Referring to Figure 1, the valve body 1 is provided with conventional pipe connecting flanges 2. The inlet passage 3 and outlet passage 4 are located on a common parallel axis A—A while the intermediate flow orifice 5, which is defined by the annular seat 6, is inclined at an angle, sloping downwardly from inlet to outlet side, to the axis A—A. Significant in this novel form of body is the cylindrical chamber 7 which is defined by the vertically projecting cylindrical wall 8 terminating with the surface 9 of the bonnet connecting flange 10. It is equally significant to observe that the connecting flange 10 is located on a plane parallel with the common axis A—A, the importance of which will be more readily appreciated later in the specification. It will be evident that the area of chamber 7 is somewhat greater than that of orifice 5.

Figure 3:
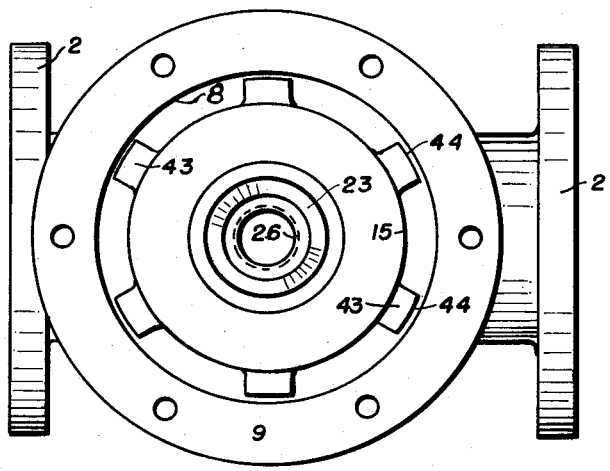
Figure 3 is a plan view taken on the line 3—3 of Figure 2 to illustrate locating guide pads of the closure member in relation with the cylindrical wall of the body chamber.

The valve closure member 11 preferably is comprised of a rigid metal core 12 and preferably is completely enveloped by a covering 13 of a material more resistant to corrosion and abrasion than the core, such as synthetic elastomer, trifluorochlorethylene polymer (Teflon) or polytetrafluoroethylene (Kel-F). The closure member, however, in non-corrosive fluid service may be cast of metal such as iron, brass, aluminum alloy or magnesium alloy without a protective envelope, employing a rubber insert in place of the annular cushion 14, aligned with seat 6. The valve closure member, preferably, is of circular cross-section as indicated by the peripheral surface 15 (Figure 3) and is located concentrically within the cylindrical wall 8 of the chamber 7.

One very important feature of my invention is that the closure member is formed with an angularly truncated lower flat surface 16 which is located in a plane oblique to the vertical axis B—B of the valve assembly, thus forming a planatary obturating surface 16 adjacent to the orifice 5 and defining the angle of inclination of the seat 6.

By this novel mode of body and closure member construction, it will be seen that the surface 9 of the body-bonnet connecting flange 10 is located parallel with the common horizontal axis A—A of the inlet passage 3 and outlet passage 4. Chamber 7 is of sufficient depth to permit the valve closure member to be moved to full open and closed position and is of sufficient cross-sectional area to insure uniformly full volumetric flow from the inlet passage 3 to the outlet passage 4 through the orifice 5 and the confluent cross-sectional area C.

The upper limit of the chamber 7 is enclosed by the flexible diaphragm 17 clamped at its peripheral area between the flange 18 of the bonnet 19 and the flange 10 of the body chamber 7 by means of suitable studs and nuts. The diaphragm has a central hole 20 which contains a rigid metal collar 21 which limits compressive force on the central clamping region of the diaphragm. The diaphragm is provided with central projections 22 on its inner and outer surfaces devised to form a fluid-tight union with the mating cavities 23 of the valve closure member and 24 of the follower member 25.

Valve closure member 11 has a threaded recess 26 extending downwardly from the top center of the member. A stem 27 having an enlarged head or bottom end 28 is inserted in said recess and held fastened to the closure member by means of a tubular sleeve 29 which is externally threaded at both ends. Sleeve 29 is screwed into recess 26 to a distance to allow the stem head to have a little play. The closure member 11, diaphragm 17 and follower member 25 are held together at their centers in fluid-tight relationship by means of nut 30 threaded onto the upper end of sleeve 29. It is obvious that nut 30 and sleeve 29 may be integrally formed.

A yoke sleeve 31 is closely fitted into a central bore in the top of bonnet 19. The stem 27 fits snugly in the bore of the sleeve 31 and slides therein. The outer end of the sleeve 31 extends outside the top of the bonnet and fits into the bore of an auxiliary mounting frame 32. A nut 33 is screwed onto the threaded outer end 34 of the sleeve 31 thereby clamping the hub 35 of frame 32 against the top of the bonnet and holding the yoke sleeve 31 firmly in place by reason of the abutment of the flange 36 against the inside surface of the bonnet.

Rotation of the interlocked valve closure member and follower member is prevented by means of two or more vertical vanes 37, extending inwardly from the wall of the bonnet, straddled by the slots 38 in the flange 39 of follower member 25.

The upper end 40 of stem 27 is adapted to be connected to mechanism capable of reciprocating the stem to any position from full open to full closure of the valve.

The sliding stem for imparting reciprocal movement to the closure elements is devised to provide concentric mounting of power-actuated auxiliary control mechanisms such as air-operated diaphragm motors, air cylinders and electric-geared operators. This mode of construction permits concentrically rigid support for auxiliary control mechanisms in perpendicular relation to the normal axis of the pipe line to which the valve is connected and is applicable, particularly, in large valves where manual operation is impractical or where some form of remote control is necessary.

To insure concentric application of the motivating force, the bonnet 19, the sliding rod or stem 27, the yoke sleeve 31, the valve closure member 11, the follower member 25 and clamping sleeve 29 are mounted along the axis B—B and in vertically disposed relation to the common axis A—A which defines the normal axis of the inlet passage 3 and outlet passage 4 of the valve body 1.

Notably important is the mode of construction which greatly improves the means for mounting the stem. The clamping sleeve 29 is devised so that it may be separately fastened into the closure member 11 to form therewith a detail sub-assembly and to form a rigidly concentric arbor to insure accurate alignment of the diaphragm 17 and follower member 25 therewith. Moreover, by merely tightening the nut 30, the closure member 11, the diaphragm 17 and follower member 25 are securely clamped in non-rotatable relation with each other, thus eliminating injurious torsional stresses on the central diaphragm projections 22, and the surrounding annular sealing area 41 of the diaphragm thereby to increase the life and to improve the reliability of the valve in actual service.

The magnitude and direction of the force required to close the valve against internal pressure, is applied along the axis B—B. The seat 6 of the orifice 5 being obliquely disposed thereto, causes a resultant force of lesser magnitude to act in the direction towards the outlet passage 4 as the obliquely disposed obturating face 16 of the closure member engages the seat 6. Under certain conditions, there can be a tendency for the closure member to slip, however, tests have proved that such tendency is counteracted by the resilience and high frictional co-efficient of elastomers or deformable plastics employed in the annular cushion 14.

Under exceptional conditions wherein very slippery plastics are used in the closure member, in combination with fluids of a lubricant nature, the frictional co-efficient between the surface 16 and the seat 6 may be extremely how, particularly in cold temperatures where certain plastics are not easily deformable.

Figure 2:
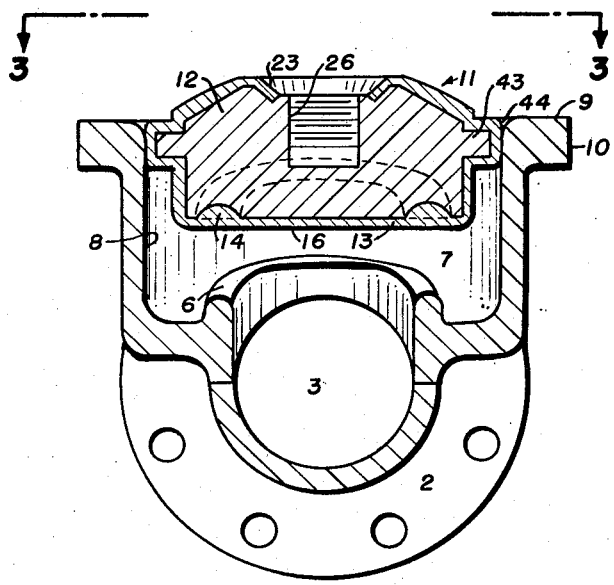
Figure 2 is a vertical cross section of the valve taken on the line 2—2 of Figure 1, with the bonnet, stem and diaphragm removed.

To prevent slipping of the closure member under such conditions, the outermost periphery 42 of the closure member is provided with a plurality of radially projecting evenly spaced locating arms or shoulder pads 43. Preferably, the pads 43 are integral with the closure member as shown in Figure 2. Obviously, any number of pads may be employed to suit any particular size of valve. Actually, only those pads located nearest the outlet passage 4 function as buffers to neutralize any tendency towards slipping or displacement of the closure member as the outermost face 44 of the locating pads come into contact with and are restrained by the inner cylindrical wall 8 of the chamber 7, in effect to maintain the truncated closure member in positive wedged engagement with the seat 6. The faces 44 of the pads 43 are spaced within clearance distance from the inner wall 8 of chamber 7 to permit the valve closure member to reciprocate freely therein from fully open to fully closed position, and vice versa. Although neither practical nor economical, the pads 43 could be replaced by ribs integral with and projecting from the wall 8 of the chamber 7.

It will be apparent that a protective shield of Kel-F or Teflon can be used, as in application Serial No. 168,075, if desired. It will also be apparent that the invention may be incorporated in a hand operated valve by substituting a known or conventional type of threaded stem and hand-wheel construction for the sliding stem construction shown and described.

It will be apparent from the foregoing description that I have provided a diaphragm valve which produces optimum volumetric efficiency. The novel construction described, improves substantially the mechanical advantage of the valve and facilitates both manual and mechanical operation.

What I claim is:

1. In a diaphragm valve an assembly comprising, a valve closure member, a follower member and a flexible diaphragm clamped therebetween at its center, a valve stem, the enlarged lower end of which is retained in a central hollow recess of said closure member, a rigid tubular sleeve threadedly receivable in said hollow recess and freely encasing the lower portion of said stem, said sleeve slidably passing through central holes in said diaphragm and said follower member and projecting beyond the latter to threadedly engage a lock nut tightened against said follower member to mount said closure member, said diaphragm and said follower member in relatively non-rotatable compression and accurate coaxial alignment on said sleeve.

2. A diaphragm valve comprising a body portion and a bonnet portion and a fluid impermeable flexible dish-shaped diaphragm clamped at its outer margin between connecting flanges of said body and bonnet, said body having an inlet passage and an outlet passage located on a common axis, a communicating orifice in said body located between said inlet and outlet passages defined by an annular seat, inclined with respect to said common axis, a chamber in said body having a peripheral wall extending outwardly from said orifice at right angles to the said common axis, said diaphragm defining the outer end of said chamber, said connecting flanges and said diaphragm being positioned in planes parallel with said common axis, a valve closure member concentrically housed within said chamber separate from and secured at its center to the fluid exposed side of said diaphragm, a follower member secured to the surface of the diaphragm remote from said chamber, said closure member having a threaded axial recess on the side adjacent to said diaphragm, a valve stem with an enlarged head mounted along the axis of said bonnet and passing through central openings in said follower member and diaphragm with the enlarged head inserted in said closure member recess, a threaded collar, having an internal cross section sufficient to slidably accommodate said stem but smaller than that of said enlarged head, threaded into said closure member recess with said enlarged head abutting against the end of said collar, the other end of said collar extending through said follower member, a nut threaded tightly onto said other end of the collar against said follower member to secure said valve closure member at its center to said diaphragm and follower member in fluid-tight relationship, means to prevent rotation of said assembled follower member and closure member, the face of said closure member adjacent said orifice being truncated and forming an obturating surface obliquely disposed with respect to the axis of said stem and conforming to the angle of inclination of said seat.

3. A diaphragm valve assembly in accordance with claim 1 in which the surface of said valve closure member opposite the face in which said hollow recess is formed is the obturating surface and is truncated at an oblique angle to the plane in which said stem lies.

4. A diaphragm valve assembly in accordance with claim 3 in which the closure member has a peripheral surface between the obturating surface and the surface in which said hollow recess is formed, said peripheral surface being formed with a plurality of spaced locating pads projecting radially from said peripheral surface and terminating at a circle drawn with the axis of said stem as the center.

5. A diaphragm valve comprising a body portion and a bonnet portion and a fluid impermeable flexible dish-shaped diaphragm clamped at its outer margin between connecting flanges of said body and bonnet, said body having an inlet passage and an outlet passage located on a common axis, a communicating orifice in said body located between said inlet and outlet passages defined by an annular seat, a chamber in said body having a peripheral wall extending outwardly from said orifice at right angles to the said common axis, said diaphragm defining the outer end of said chamber, said connecting flanges and said diaphragm being positioned in planes parallel with said common axis, a valve closure member concentrically housed within said chamber separate from and secured at its center to the fluid exposed side of said diaphragm, a follower member secured to the surface of the diaphragm remote from said chamber, said closure member having a threaded axial recess on the side adjacent to said diaphragm, a valve stem with an enlarged head mounted along the axis of said bonnet and passing through central openings in said follower member and diaphragm with the enlarged head inserted in said closure member recess, a threaded collar, having an internal cross section sufficient to slidably accommodate said stem but smaller than that of said enlarged head, threaded into said closure member recess with said enlarged head abutting against the end of said collar, the other end of said collar extending through said follower member, a nut threaded tightly onto said other end of the collar against said follower member to secure said valve closure member at its center to said diaphragm and follower member in fluid-tight relationship, and means to prevent rotation of said assembled follower member and closure member.

References Cited in the file of this patent

UNITED STATES PATENTS

| | | |
|---|---|---|
| 1,662,291 | Bastian | Mar. 13, 1928 |
| 2,035,202 | Smith | Mar. 24, 1936 |
| 2,194,541 | Buttner | Mar. 26, 1940 |
| 2,504,057 | Trefil | Apr. 11, 1950 |
| 2,631,613 | Bergstrom | Mar. 17, 1953 |
| 2,638,307 | Fortune | May 12, 1953 |
| 2,654,561 | Trefil | Oct. 6, 1953 |

FOREIGN PATENTS

| | | |
|---|---|---|
| 70,826 | Holland | of 1952 |